United States Patent [19]
Schillaci et al.

[11] Patent Number: 6,094,022
[45] Date of Patent: Jul. 25, 2000

[54] LOW JITTER ZERO CROSSING BEMF DETECTOR AND MOTOR INCORPORATING THE SAME

[75] Inventors: Luca Schillaci, Pavia; Maurizio Nessi, Como; Giacomino Bollati, Castel San Giovanni; Ezio Galbiati, Agnadello, all of Italy

[73] Assignee: STMicroelectronics S.r.l., Agrate Brianza, Italy

[21] Appl. No.: 09/346,650

[22] Filed: Jul. 1, 1999

[51] Int. Cl.[7] .................................................. H02K 23/00
[52] U.S. Cl. ........................ 318/254; 318/632; 318/138; 318/439; 318/771; 318/798; 318/805; 388/800; 388/809
[58] Field of Search .................................. 360/78.04, 75; 388/800, 809; 318/632, 138, 439, 254, 771, 798, 805

[56] References Cited

U.S. PATENT DOCUMENTS

| | | | |
|---|---|---|---|
| 5,783,920 | 7/1998 | Hahn | 318/632 |
| 5,796,545 | 8/1998 | Canclini | 318/632 |
| 5,862,301 | 1/1999 | Gontowski, Jr. | 318/632 |

Primary Examiner—Karen Masih
Attorney, Agent, or Firm—Theodore E. Galanthay; David V. Carlson; Seed IP Law Group PLLC

[57] ABSTRACT

A BEMF detector and method detect the BEMF of a three-phase motor using a fully differential detection system. The motor has a first coil coupled between a first coil tap and a center tap, a second coil coupled between a second coil tap and the center tap, and a third coil coupled between a third coil tap and the center tap. The BEMF detector includes a differential amplifier having first and second inputs and first and second outputs, with the first input being coupled to one of the coil taps and the second input being coupled to the center tap. The BEMF detector also includes a comparator having first and second inputs coupled respectively to the first and second outputs of the differential amplifier and an output at which a BEMF signal is produced that is related to the BEMF of the motor. The differential amplifier may be part of an anti-alias filter structured to fix to a known stable value a common mode at the outputs of the differential amplifier. The BEMF detector also may include one or more fully differential filters positioned between the differential amplifier and the comparator to reduce noise and smooth the BEMF signal output by the comparator. One of the filters can be a linear phase, switched capacitor filter with a stable cutoff frequency.

20 Claims, 2 Drawing Sheets

LOW JITTER ZERO CROSSING BEMF DETECTOR AND MOTOR INCORPORATING THE SAME

TECHNICAL FIELD

The present invention relates to a three-phase brushless motor operating in a pulse width modulated (PWM) mode, and more particularly, to a back electromotive force (BEMF) detector for detecting the BEMF of the motor.

BACKGROUND OF THE INVENTION

Three-phase brushless DC motors have many uses, among which are as spindle motors for computer hard disk drivers, digital video disk (DVD) drivers, CD players, and tape-drives for video recorders. Such motors are recognized as having the highest torque and power capability for a given size and weight. Compared to DC motors employing brushes, brushless DC motors enjoy reduced noise generation and improved reliability because no brushes need to be replaced due to wear.

FIG. 1 shows such a three-phase brushless DC motor 10 with three phases A, B, C having three coils 12, 14, 16 connected to each other in a Y-configuration at a center tap 18. As is well-known, the coils 12, 14, 16 are part of a stator that causes a permanent magnet rotor to rotate. The three coils 12, 14, 16 are connected to the center tap 18 by respective resistors 19, 20, 21. The first coil 12 (phase A) is connected through a coil tap A to a supply voltage Vcc by a first high-side transistor 22 and to ground via a first low-side transistor 23; the second coil 14 (phase B) is connected through a coil tap B to the supply voltage Vcc by a second high-side transistor 24 and to ground via a second low-side transistor 26; and the third coil 16 (phase C) is connected through a coil tap C to the supply voltage Vcc by a third highside transistor 28 and to ground by a third low-side transistor 30. Each of the transistors is an NMOS transistor as is typical. Represented in FIG. 1 by voltage supply symbols are respective back EMF sources EA, EB, EC that are inherently induced by the permanent magnets of the rotor while the rotor is rotated.

This type of motor is driven by exciting its phases in a suitable sequence while always keeping two phases under power and leaving a third phase in tristate or floating with a high impedance (Z). For example, in FIG. 1 phase A is driven with a PWM signal (PWM in), phase B is coupled to ground, and phase C is left in tristate. This results in a current IA through the phase A having a value of +I, a current IB through the phase B having a value of −I, and zero current IC through the phase C. At predetermined instances the driving of the phases switches so that current is driven through the phase that was previously floating and one of the other phases is left floating such that the algebraic sum of the currents in the three phases are always equal to zero. The driving sequence is as follows where the first letter indicates the phase of positive current flow and the second letter indicates the phase of negative current flow:

AB—AC—BC—BA—CA—CB.

With respect to whichever phase is currently in tristate (phase C in FIG. 1), a BEMF is produced in that phase and can be measured by measuring the voltage difference between the coil tap for that phase (coil tap C in FIG. 1) and the center tap CT. When that BEMF changes its polarity with respect to the center tap voltage, a zero-crossing is detected. This provides an indication for the next phase advancement and the rate of zero-crossing occurrences is directly proportional to the motor speed. Consequently, BEMP zero-crossing information is important for speed control.

In recent systems with PWM control, the phase in tristate sees a common mode signal that varies between zero and Vcc/2 because of the two phases (ON/OFF) of the PWM signal. During the ON phase, the common mode is brought to Vcc/2 and during the OFF phase is brought to zero. The different impedances at the nodes also results in a differential voltage modulation across the phase in tristate and therefore a differential modulation of the BEMF.

Prior art PWM systems sample and measure the BEMF only during the ON phase and employ only a minimum mask to try to block the noises causes by the power commutations between the three phases of the motor. These prior art systems do not sample the BEMF during the OFF phase of the PWM signal, the phase in which the common mode is zero. This translates in an uncertainty in the measurement of the zero-crossing of the BEMF, and therefore, in a jitter in the synchronization of the phases of the motor.

SUMMARY OF THE INVENTION

Embodiments of the invention include a BEMF detector and method for detecting BEMF of a three-phase motor using a fully differential detection system. The motor has a first coil coupled between a first coil tap and a center tap, a second coil coupled between a second coil tap and the center tap, and a third coil coupled between a third coil tap and the center tap. The BEMF detector includes a differential amplifier having first and second inputs and first and second outputs, with the first input being coupled to one of the coil taps and the second input being coupled to the center tap. The BEMF detector also includes a comparator having first and second inputs coupled respectively to the first and second outputs of the differential amplifier and an output at which a BEMF signal is produced that is representative of the BEMF of the motor.

In one embodiment, the differential amplifier is part of an anti-alias filter structured to fix to a known stable value a common mode at the outputs of the differential amplifier. The BEMF detector also may include one or more fully differential filters positioned between the differential amplifier and the comparator to reduce noise and smooth the BEMF signal output by the comparator. One of the filters can be a linear phase, switched capacitor filter with a stable cutoff frequency.

The method couples the second phase of the motor to a reference voltage and keeps the third phase of the motor in tristate while driving the first phase with a PWM signal having an ON period and an OFF period. The method measures a differential voltage across the third phase during both the ON and OFF periods of the PWM signal. That differential voltage if the BEMF of the motor and its measurement suffers from less jitter because it is taken during the ON and OFF periods of the PWM signal, unlike prior art methods.

DETAILED DESCRIPTION

Figure 2:
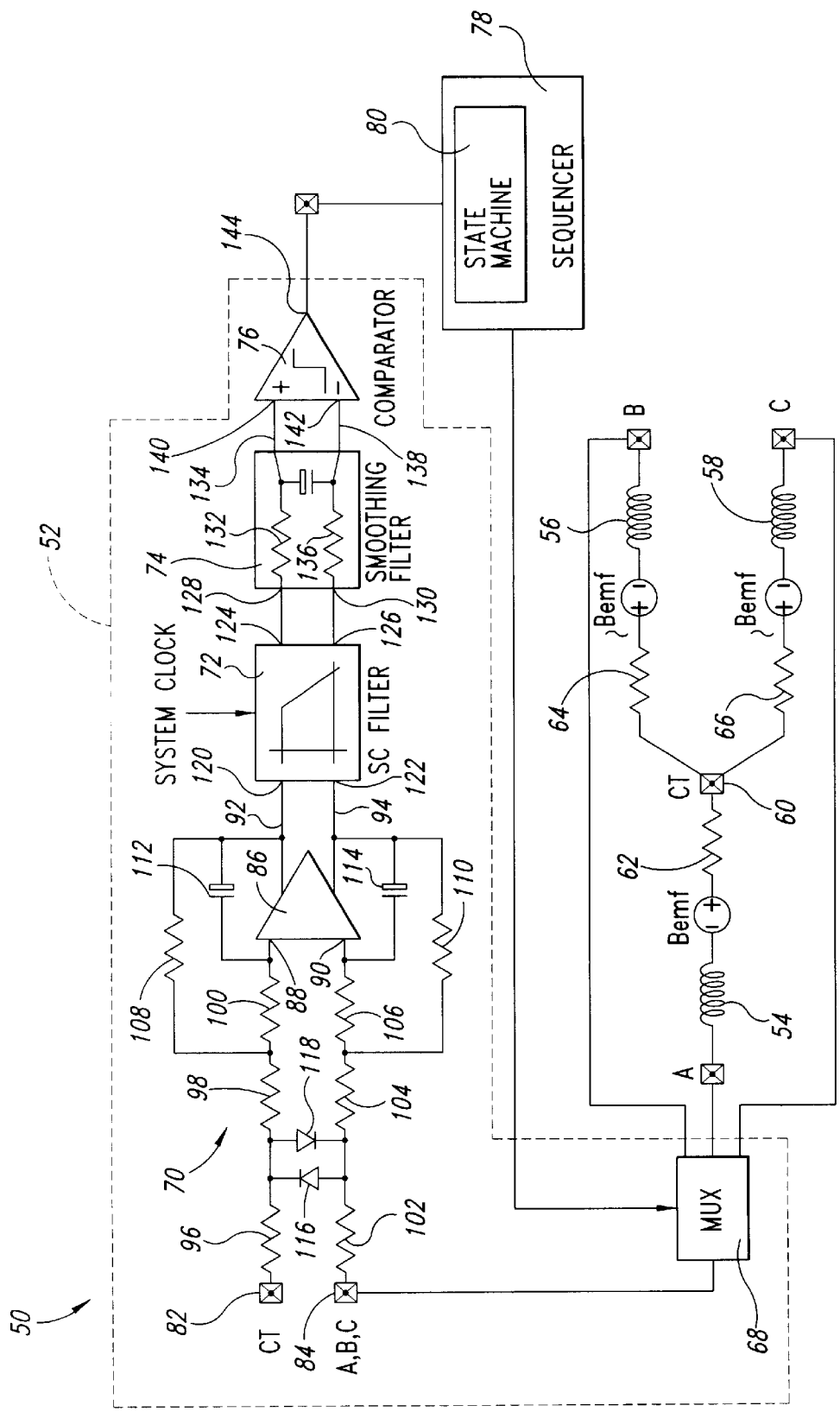
FIG. 2 is a schematic circuit diagram of a three-phase brushless motor and BEMF detector according to an embodiment of the invention.

A motor 50 with a BEMF detector 52 according to an embodiment of the invention is shown in FIG. 2. Unlike prior art designs, the BEMF detector 52 is fully differential which provides immunity to common mode disturbances. In addition, the BEMF detector 52 operates during both the ON and OFF periods of the PWM signal driving the motor 50 which provides a more accurate measurement of the BEMF of the motor.

Figure 1:
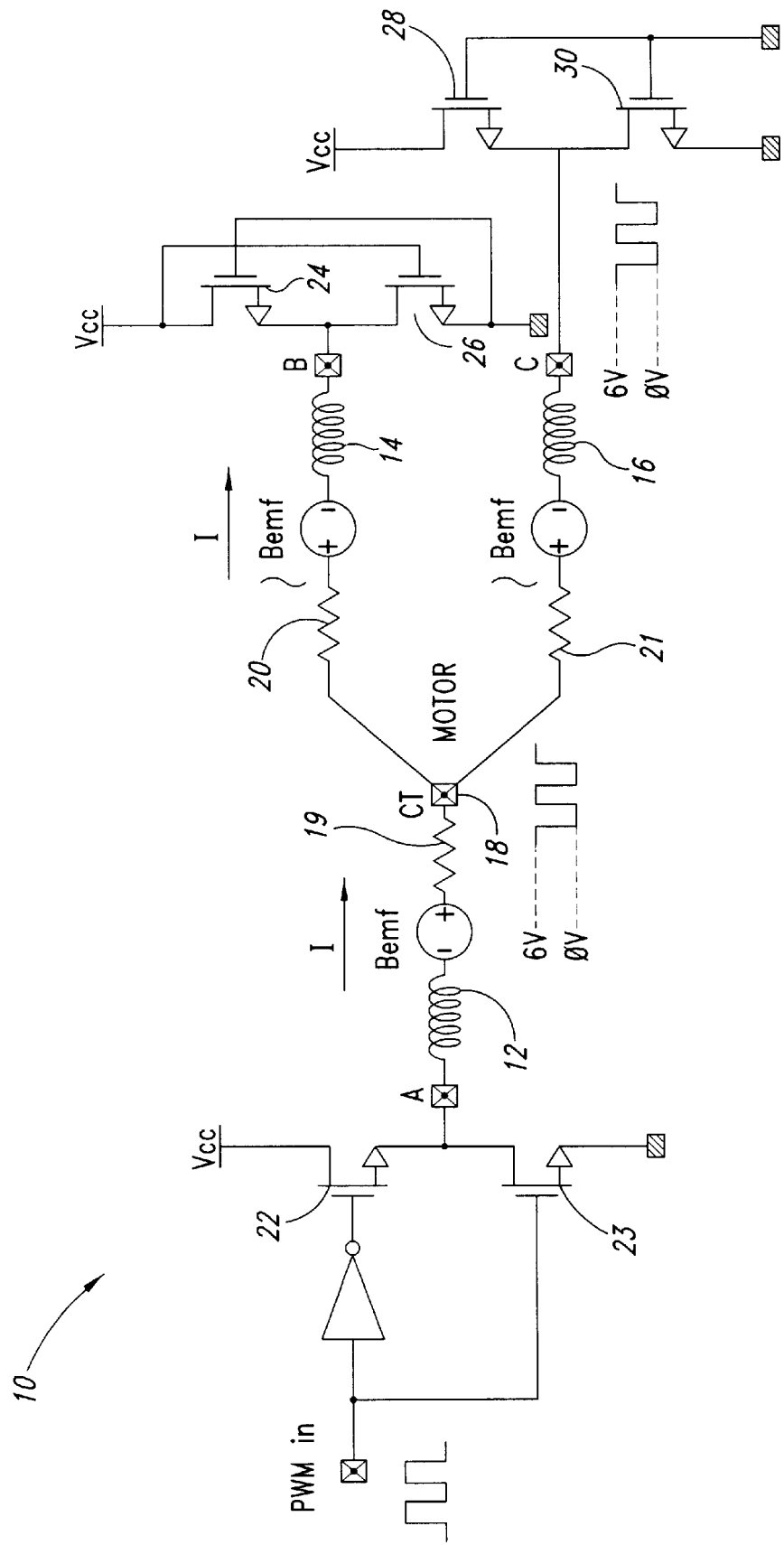
FIG. 1 is a circuit diagram of a three-phase brushless motor according to the prior art.

The motor 50 includes three phases A, B, C having three coils 54, 56, 58 connected to each other in a Y-configuration at a center tap 60. The three coils 54, 56, 58 are connected to the center tap 60 by respective resistors 62, 64, 66. As is well-known, the coils 12, 14, 16 are part of a stator that causes a permanent magnet rotor to rotate. Represented in FIG. 2 by voltage supply symbols are respective back EMF sources EA, EB, EC that are inherently induced by the permanent magnets of the rotor while the rotor is rotated. The drive transistors for driving the three coils 54, 56, 58 in sequence are not shown, for simplicity, but can be substantially identical to those shown in FIG. 1.

The BEMF detector 52 includes a multiplexor 68, an anti-alias filter 70, a switched capacitor (SC) filter 72, a smoothing filter 74, and a comparator 76 serially connected to the three phases A, B, C of the motor 50. Each of the filters 70–72 and the comparator 76 are fully differential to provide optimum immunity to common mode disturbances. This contrasts with prior art designs that require a separate voltage reference to be employed, which does not provide the accuracy and immunity to noise of the fully differential design of the embodiment of the invention shown in FIG. 2.

The multiplexor 68 has three input channels respectively connected to the first, second, and third coils 54, 56, 58 of the three phases A, B, C. The multiplexor 68 sequentially connects the coils 54, 56, 58 to the anti-alias filter 70 under the control of a sequencer 78 that includes a state machine 80. The state machine 80 of the sequencer 78 causes the multiplexor 68 to connect to the anti-alias filter 70 whichever one of the phases A, B, C currently is in tristate to enable the BEMF of that phase to be detected. The multiplexor 68 can be implemented by conventional NMOS switches or numerous other conventional multiplexors.

The anti-alias filter 70 includes a first input 82 connected to the central tap 60 and a second input 84 connected to the output of the multiplexor 68. The anti-alias filter 70 also includes a differential amplifier 86 having first and second inputs 88, 90 and first and second outputs 92, 94. The first input 88 of the differential amplifier 86 is connected to the first input 82 of the anti-alias circuit 70 by first, second, and third resistors 96, 98, 100 while the second input 90 of the differential amplifier 86 is connected to the second input 84 of the anti-alias circuit 70 by fourth, fifth, and sixth resistors 102, 104, 106. A seventh resistor 108 is feedback-connected from the first output 92 of the differential amplifier 86 to a node between the second and third resistors 98, 100 and an eighth resistor 110 is feedback-connected from the second output 94 of the differential amplifier 86 to a node between the fifth and sixth resistors 104, 106. A first capacitor 112 is feedback-connected between the first input 88 and first output 92 of the differential amplifier 86 while a second capacitor 114 is feedback-connected between the second input 90 and second output 94 of the differential amplifier 86. A pair of diodes 116, 118 are connected in parallel from a node between the first and second resistors 96, 98 to a node between the fourth and fifth transistors 102, 104. Such diodes act substantially "clamps" for the input signal in order to limit its amplitude. It is not essential to process the whole signal since the aim is to detect the zero-crossing of the same, i.e. the polarity change of the BEMF The anti-alias filter 70 is designed to fix the common mode at the outputs 92, 94 of the differential amplifier 86 at a known reference, e.g., Vcc/2 in the example shown in FIG. 2, and provide an initial anti-alias filtering. The values of the resistors and capacitors of the anti-alias filter 70 depend on the frequency of the PWM signal used to drive the phases A, B, C of the motor 50, which in one example is 80 kHz. However, it will be appreciated that resistance and capacitance values are symmetrical about an imaginary horizontal line drawn through the differential amplifier 86, that is, the values of the two capacitors 112, 114 are equal and the values of the resistors 96, 98, 100, 108 are equal to the values of the resistors 102, 104, 106, 110, respectively. Further, the values of the first, second, fourth, and fifth resistors 96, 98, 102, 104 are each about half of the value of each of the third, sixth seventh, and eighth resistors 100, 106, 108, 110.

The SC filter 72 includes first and second inputs 120, 122 coupled respectively to the first and second outputs of the differential amplifier 86 (which are the outputs of the anti-alias filter 70) and first and second outputs 124, 126. The SC filter 72 is a linear phase filter having a cutoff frequency that should be fixed based on considerations of attenuating the disturbances and on the inevitable phase delay introduced by SC filter 72 at the maximum rotation frequency, which should not be too high. That phase delay, known from the cutoff frequency of the SC filter 72 and the frequency of the input signal (known from the speed of the motor), is invariant and therefore easily compensated for by the sequencer 78. The cutoff frequency of the SC filter depends during operation only on the system clock of the system that includes the motor 50. As a result, the frequency and phase response of the SC filter 72 are invariant to system fluctuations, such as temperature. In one embodiment the cutoff frequency was set at 20 kHz, but that is exemplary only. Numerous known SC filters could be employed for the SC filter 72, such as the biquad switched capacitor filter described in U.S. Pat. No. 5,391,999, which is incorporated herein by reference in its entirety.

The smoothing filter 74 includes first and second inputs 128, 130 connected respectively to the first and second outputs of the SC filter 72. A first resistor 132 is connected between the first input 128 and a first output 134 of the smoothing filter 74 while a second resistor 136 is connected between the second input 130 and a second output 138 of the smoothing filter. A capacitor 140 is also connected between the outputs 134, 138 of the smoothing filter 74. The smoothing filter 74 softens the output differential from the SC filter 72 which otherwise would have a step trend.

The comparator 76 includes non-inverting and inverting inputs 140, 142 connected respectively to the first and second outputs 134, 138 of the smoothing filter 74. The comparator 76 also includes an output 144 at which a BEMF signal related to the BEMF of the motor 50 is produced. The BEMF signal at the output 144 is related to the difference between the two differential signals at the inputs 140, 142 of the comparator 76. In particular, the output signal is substantially a square-wave form having the same frequency of the BEMF. In fact, the signal at the output 144 is triggered by the polarity change in the BEMF of the motor.

Coupled to the output 144 of the comparator 76 (which is also the output of the BEMF detector 52) is the sequencer 78. In response to detecting that the BEMF signal at the output 144 of the comparator 76 has changed polarity (zero-crossing), the sequencer 78 causes the multiplexor 68 to connect to the second input 84 of the anti-alias filter 70 whichever one of the phases A, B, C of the motor 50 is being placed in tristate next. In addition, the sequencer 78 can employed to synchronize the driving of the phases A, B, C of the motor 50. If the zero-crossing occurs sooner or later than expected, the sequencer 78 can cause the driving transistors (not shown in FIG. 2) and the multiplexor 68 to switch sooner or later as needed to adjust for the early or late zero-crossing.

Given the importance of the BEMF zero-crossing detection to the synchronization of the driving of the motor 50, it is very important that BEMF signal output by the BEMF detector 52 be as accurate and as noise-free as possible. By employ entirely differential filters 70–74 and a differential comparator 76, the BEMF detector 52 always acts in the same way to greatly reduces the noise in the BEMF signal that is output. Less noise translates in a more accurate detection of the zero-crossing of the BEMF signal, and thus, more accurate synchronization of the driving of the motor 50. Moreover, the BEMF detector 52 measures the BEMF during both the ON and OFF periods of the PWM signal being used to drive the motor 50, which further improves the accuracy of the BEMF signal output by the BEMF detector.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A BEMF detector for detecting BEMF of a three-phase motor having a first coil coupled between a first coil tap and a center tap, a second coil coupled between a second coil tap and the center tap, and a third coil coupled between a third coil tap and the center tap, the BEMF detector comprising:
   a differential amplifier having first and second inputs and first and second outputs, the first input being coupled to one of the coil taps and the second input being coupled to the center tap; and
   a comparator having first and second inputs coupled respectively to the first and second outputs of the differential amplifier and an output at which a BEMF signal is produced that is related to the BEMF of the motor.

2. The BEMF detector of claim 1 wherein the differential amplifier is part of an anti-alias filter structured to fix to a known stable value a common mode at the outputs of the differential amplifier.

3. The BEMF detector of claim 2 wherein the anti-alias filter includes:
   a first capacitor coupled between the first input and first output of the differential amplifier;
   a second capacitor coupled between the second input and second output of the differential amplifier;
   a first resistor having first and second ends with the first end being coupled to the first output of the differential amplifier;
   a second resistor having a first end coupled to the second end of the first resistor and a second end coupled to the first input of the differential amplifier;
   a third resistor having first and second ends with the first end being coupled to the second output of the differential amplifier; and
   a fourth resistor having a first end coupled to the second end of the third resistor and a second end coupled to the second input of the differential amplifier.

4. The BEMF detector of claim 3 wherein the anti-alias filter includes:
   a fifth resistor having a first end coupled to the center tap and a second end;

a sixth resistor having a first end coupled to the second end of the fifth resistor and a second end coupled to the first end of the second transistor;
   a seventh resistor having a first end coupled to one of the coil taps and a second end;
   an eighth resistor having a first end coupled to the second end of the seventh resistor and a second end coupled to the first end of the fourth transistor; and
   first and second diodes coupled in parallel with each other between the second end of the fifth transistor and the second end of the seventh transistor, the first and second diodes being oppositely polarized with respect to each other.

5. The BEMF detector of claim 1, further comprising a first filter coupled between the differential amplifier and the comparator, the first filter having first and second inputs coupled respectively to the first and second outputs of the differential amplifier and first and second outputs coupled respectively to the first and second inputs of the comparator.

6. The BEMF detector of claim 5 wherein the first filter is a switched capacitor filter having plural stages.

7. The BEMF detector of claim 6, further comprising a second filter coupled between the first filter and the comparator, the second filter having first and second inputs coupled respectively to the first and second outputs of the first filter and first and second outputs coupled respectively to the first and second inputs of the comparator.

8. The BEMF detector of claim 5 wherein the first filter is a smoother filter having first and second resistors coupled respectively to the first and second inputs of the first filter and a capacitor coupled between the first and second resistors.

9. The BEMF detector of claim 1, further comprising a multiplexor structured to alternately connect the first, second, and third coil taps to the first input of the differential amplifier.

10. A three-phase motor having a speed that is controlled based on detection of a BEMF of the motor, the motor comprising:
    first coil coupled between a first coil tap and a center tap;
    a second coil coupled between a second coil tap and the center tap;
    a third coil coupled between a third coil tap and the center tap;
    a differential anti-alias filter first and second inputs and first and second outputs, the first input being coupled to one of the coil taps and the second input being coupled to the center tap; and
    a comparator having first and second inputs coupled respectively to the first and second outputs of the anti-alias and an output at which a BEMF signal is produced that is related to the BEMF of the motor.

11. The motor or of claim 10 wherein the anti-alias filter includes:
    a differential amplifier having first and second input and first and second outputs coupled to the first and second outputs of the anti-alias filter;
    a first capacitor coupled between the first input and first output of the differential amplifier;
    a second capacitor coupled between the second input and second output of the differential amplifier;
    a first resistor having first and second ends with the first end being coupled to the first output of the differential amplifier;
    a second resistor having a first end coupled to the second end of the first resistor and a second end coupled to the first input of the differential amplifier;

a third resistor having first and second ends with the first end being coupled to the second output of the differential amplifier; and a fourth resistor having a first end coupled to the second end of the third resistor and a second end coupled to the second input of the differential amplifier.

12. The motor of claim 11 wherein the anti-alias filter includes:

a fifth resistor having a first end coupled to the center tap and a second end;

a sixth resistor having a first end coupled to the second end of the fifth resistor and a second end coupled to the first end of the second transistor;

a seventh resistor having a first end coupled to one of the coil taps and a second end;

an eighth resistor having a first end coupled to the second end of the seventh resistor and a second end coupled to the first end of the fourth transistor; and first and second diodes coupled in parallel with each other between the second end of the fifth transistor and the second end of the seventh transistor, the first and second diodes being oppositely polarized with respect to each other.

13. The motor of claim 10, further comprising first and second differential filters coupled consecutively between the anti-alias filter and the comparator.

14. The motor of claim 10, further comprising a linear phase, switched capacitor filter coupled between the anti-alias filter and the comparator.

15. The motor of claim 10, further comprising a smoother filter having a first resistor coupled between the first output of the anti-alias filter and the first input of the comparator, a second resistor coupled between the second output of the anti-alias filter and the second input of the comparator, and a capacitor coupled between the first and second resistors.

16. The motor of claim 10, further comprising a multiplexor structured to alternately connect the first, second, and third coil taps to the first input of the anti-alias filter.

17. A method for detecting a BEMF of a three-phase motor having first, second, and third phases connected to each other at a center tap, the method comprising:

driving the first phase of the motor with a PWM signal having an ON period and an OFF period;

coupling the second phase of the motor to a reference voltage while driving the first phase with the PWM signal;

keeping the third phase of the motor in tristate while driving the first phase with the PWM signal;

measuring a differential voltage across the third phase during both the ON and OFF periods of the PWM signal.

18. The method of claim 17 wherein the measuring step is performed using a differential amplifier having first and second inputs and first and second outputs, the first input being coupled to the center tap, the method further comprising electrically connecting the third phase to the second input of the differential amplifier while the third phase is in tristate.

19. The method of claim 18, further comprising filtering in a fully differential manner a differential BEMF signal output by the differential amplifier to produce a filtered first BEMF signal and a filtered second BEMF signal and submitting the first and second BEMF signals respectively to first and second inputs of a comparator which produces an output BEMF signal related to the BEMF of the motor.

20. The method of claim 18, further comprising fixing a common mode output by the differential amplifier to a predetermined value during the ON and OFF phases of the PWM signal.

* * * * *